United States Patent [19]

Axelrod

[11] 4,019,050
[45] Apr. 19, 1977

[54] OPTICAL INSPECTION SYSTEM

[76] Inventor: Norman N. Axelrod, 445 E. 86th St., New York, N.Y. 10028

[22] Filed: June 17, 1975

[21] Appl. No.: 587,543

[52] U.S. Cl. .............................. 250/222 R; 250/209; 250/223 R; 250/578; 356/168
[51] Int. Cl.² ........................................ G01B 11/24
[58] Field of Search ....... 250/223 R, 223 B, 222 R, 250/208, 209, 578; 356/168, 165, 156; 340/146.3 AC; 209/111.7

[56] References Cited

UNITED STATES PATENTS

| | | | |
|---|---|---|---|
| 2,402,405 | 6/1946 | Hurley, Jr. | 356/168 X |
| 2,898,801 | 8/1959 | Rockafellow | 356/168 X |
| 3,529,169 | 9/1970 | Heaney et al. | 250/223 B |
| 3,546,377 | 12/1970 | Troll | 356/168 X |
| 3,549,890 | 12/1970 | Keller | 250/209 |
| 3,563,666 | 2/1971 | Foster | 250/222 R X |

OTHER PUBLICATIONS

Rottman, *Sequential Optical Inspection Technique*, IBM Technical Disclosure Bulletin, vol. 8, No. 4, Sept. 1965, pp. 589, 590.

Primary Examiner—Eugene R. LaRoche

[57] ABSTRACT

An optical inspection system is adapted to provide a null when an inspected object is of prescribed geometry. An optical beam forms an image of the object to be inspected and detectors are placed in pairs at like positions, dictated by the symmetry of the image, to exhibit like signals when those positions in the image actually are alike. The system is adaptable to assembly line operation by the placement of detectors at like positions with respect to each of two consecutive images similarly generating like signals when like portions of the images are identical.

2 Claims, 6 Drawing Figures

OPTICAL INSPECTION SYSTEM

FIELD OF THE INVENTION

This invention relates to an optical inspection system for determining dimension or shape of, or structural defects in, an object.

BACKGROUND OF THE INVENTION

A variety of optical inspection systems for examining objects are known. A typical system of this type includes means for establishing, in an image plane, an image of an object to be examined. An array of photocells is placed in the image plane at the shadow boundary of the image. In one such prior art system, signals corresponding to the output generated by the photocell array during each interval of an inspection sequence (representative of the dimensions of the object measured) are compared with signals stored in a standard register to provide a digital readout which represents the deviation of the object from the standard. In an alternative system, the signal from each cell, during each such interval, is applied to electric circuitry which compares the value of the signals with preselected signals of fixed limits and furnishes accept or reject decisions to a memory.

Prior art systems of this type require the storage of signals which represent the standard of comparison with which the signals, provided during each interval, are compared. These systems operate by storing and comparing the output signals generated during each interval in the inspection sequence, an operation which consumes a considerable amount of computer memory and processing time. Further, such systems typically require the rotation of an object about its axis of symmetry for a full inspection sequence.

BRIEF DESCRIPTION OF THE INVENTION

An inspection system operative in accordance with the principles of the present invention eliminates the necessity for storing a standard of comparison, eliminates the necessity for processing a bulk of the information provided during each interval of an inspection sequence, and eliminates the necessity for rotating an object during inspection. The invention is based on the recognition that most objects either have some intrinsic symmetry or can be positioned sequentially, as on an assembly line, in a manner to establish a translational symmetry even though an individual one of those objects has no symmetry at all. The invention is further based on the recognition that photocells can be organized in pairs in positions dictated by that symmetry so that associated pairs correspond to like positions of an image of the inspected object and provide like output signals when an inspected object is perfect.

In a preferred embodiment, like-placed photocells in an image plane at the shadow boundary of (an object or) objects on an assembly line, are organized in pairs to apply their output signals to inputs to associated comparators. The comparators exhibit outputs only when a difference occurs between input signals thereto, an occurrence which indicates a defective object (or a difference between two consecutive objects). When, for example, consecutive like (perfect) objects are inspected and associated pairs of detectors correspond to like portions of consecutive objects, only like signals are applied to the comparators, the comparators exhibit no outputs. Relatively little storage and processing time is required as a result. Further no standard need be stored either.

An important feature of this invention, accordingly, is an inspection system including means for positioning inspected objects in the path of a beam of light to form an image which exhibits a translational symmetry and/or an intrinsic symmetry, and the placement of photocells in the image plane of the objects, in pairs, in positions dictated by that symmetry so that like light intensities impact associated cells except when an inspected object is imperfect.

A further feature of this invention is electrical circuitry adapted to respond only to different output signals from associated pairs of photocells for providing an output signal indicative of a defective object.

DETAILED DESCRIPTION

Figure 1:
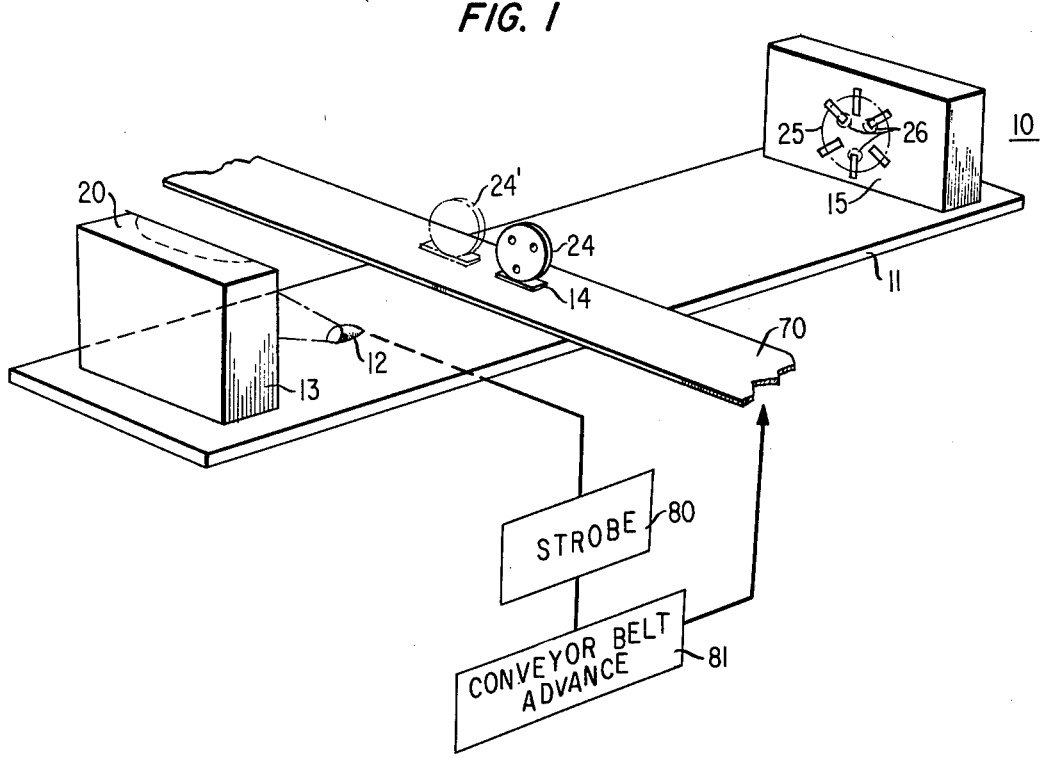
FIG. 1 is a plan view of an optical inspection system arrangement in accordance with this invention.

FIG. 1 shows an optical system arrangement 10 comprising a rigid frame 11 to which are mounted a light source 12, a mirror assembly 13, an object holder 14, and an image plane-defining assembly 15. The various elements are arranged to direct a beam of collimated light in a manner to form an enlarged image of an object held by holder 14 in an image plane defined by assembly 15. Alternatively, the system also can be implemented in a reflection mode with the objects horizontal and with a laser or laser optics arrangement to reduce complexity.

Mirror assembly 13 houses a spherical mirror 20 with light source 12 mounted at the focal point to provide a broad beam of collimated light directed at the image plane. Holder 14 is positioned to hold an object in a position at a distance from the mirror selected so that the image of the object is formed at assembly 15. An arrangement of this type is described in Masino et al. U.S. Pat. No. 3,549,896, issued Dec. 22, 1970.

Holder 14 is shown positioning an illustrative three-hole button 24. The button, of course, has a rotation symmetry which we capitalize on herein in determing the placement of detectors for an inspection sequence in accordance with this invention. The collimated beam forms an image of the button as indicated by the circles 25 and 26 in FIG. 1.

Figure 2:
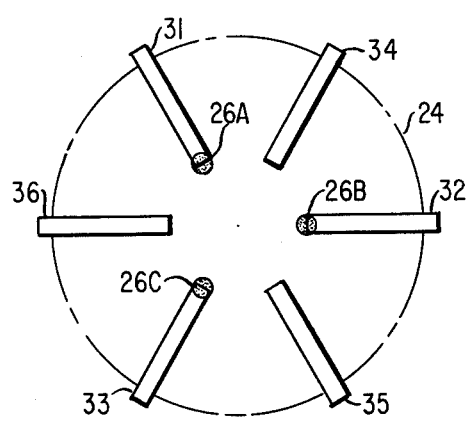
FIG. 2 is a top view of an illustrative object for inspection by the system of FIG. 1 and showing the placement of detector elements with respect thereto.

FIG. 2 shows an enlarged view of the image of button 24, the holes being designated 26A, 26B, and 26C. Six detectors are shown in positions radially oriented with respect to the button. The three detectors corresponding to holes 26A, 26B, and 26C, respectively, are designated 31, 32, and 33. The remaining detectors positioned intermediate the holes are designated 34, 35, and 36. Each detector indication may be thought of as including two active areas or as representing two discrete detectors, one associated with a button hole and one associated with the circumference of the button.

Figure 3:
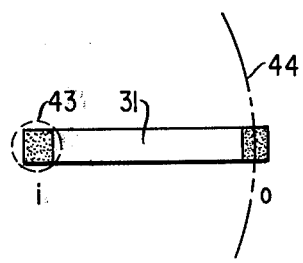
FIG. 3 is a schematic top view of a detector element for use in the system of FIG. 1, and FIGS. 4, 5, and 6 are diagrams of electrical circuits for use in the system of FIG. 1.

FIG. 3 shows a representative detector assembly with two active areas $i$ and $o$ at the two ends thereof. Area $i$ is associated with the button hole as indicated by broken circle 43. Area $o$ is associated with the circumference of the button represented by broken partial curve 44. A typical detector suitable for this purpose is a photovoltiac cell of elongated dimensions masked to receive light only in the active areas. Alternatively, individual detectors may be employed instead of active areas of a single detector.

In any case, the signals generated by the detectors are applied to a comparator in a manner to generate a null unless some deviation in the geometry of the examined object occurs. Rather than storing a standard of comparison in memory, the detectors are arranged physically so that no signals occur for comparison unless the inspected object differs from the standard of comparison established by the physical placement of the detectors. That physical placement of the detectors reflects the symmetry of the inspected object and obviates the necessity for storing a standard of comparison.

Figure 4:
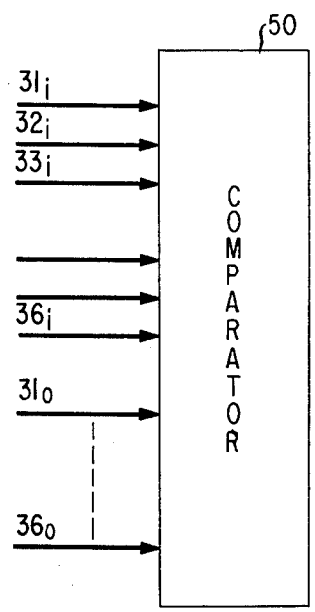

The signals generated by the detectors in the illustrative embodiment of FIG. 2 are applied to a comparator. If we adopt the convention that the inner active area of each detector is designated $i$ and the outer active area is designated $o$, than the 12 detectors or active areas can be designated $31_i \ldots 36_i$ and $31_o \ldots 36_o$ as indicated in FIG. 4. These detectors apply their outputs in pairs to comparator 50 of FIG. 4.

Figure 5:
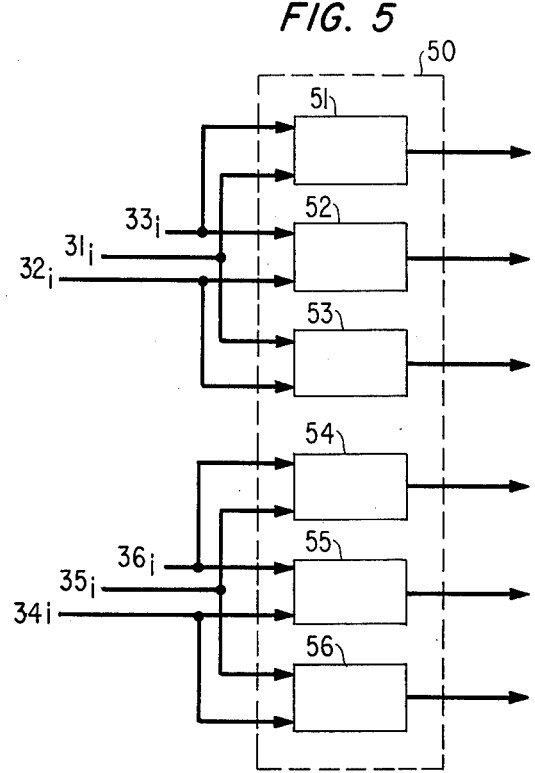

For the determination, during each inspection period, as to whether the button holes exist and are properly located, the inner detectors $31_i \ldots 36_i$ are employed. The differences between $32_i$ and $33_i$, $33_i$ and $31_i$ and $31_i$ and $32_i$ and the differences between $36_i$ and $35_i$, $35_i$ and $34_i$, and $34_i$ and $36_i$ are compared. That is to say, the outputs from these detectors are applied in pairs to comparators (50 of FIG. 4) and the comparators produce no outputs when the button holes are properly located. The arrangement for applying the detector outputs to the comparators in pairs is illustrated in FIG. 5 where individual comparators 51, 52, 53, 54, 55, and 56 are shown encompassed within block 50. FIG. 5 also shows the proper inputs associated with each block. When inputs $31_i$ and $33_i$ are alike, a button hole is detected as expected and comparator 51 exhibits no output signal. Similarly, when the remaining inner detectors exhibit like signals, the associated comparators exhibit nulls and the correct number and placement of button holes is ascertained.

The periphery of the button is ascertained to be a circle via signals from the outer detectors. Specifically, assuming like placement of the outer detectors with respect to the periphery of the button image, signals from $33_o$ and $34_o$, $31_o$ and $35_o$, and $32_o$ and $36_o$ are applied in pairs to comparators in an arrangement as shown in FIGS. 4 and 5 for the inner detectors. The comparators exhibit nulls if the periphery of the button is a circle.

The arrangement is insensitive to the orientation of the button as long as the detectors are closely spaced (less than the diameter of a hole in the button).

The placement of the detectors in FIG. 2 reflects the symmetry of a single object inspected. As was mentioned hereinbefore, the placement can be dictated by the translational symmetry exhibited by a series of like objects even if the individual objects have no intrinsic symmetry. Consider, for example, a sequence of buttons on an assembly line. FIG. 1 shows two consecutive-like buttons 24 and 24' on a conveyor belt 70. By adapting mirror assembly 13 to project a beam sufficiently broad to encompass an area greater than a single button, at least partial images of the two buttons are formed in the image plane. For convenience we will consider the situation where the beam is sufficiently broad to define fully the images of two consecutive buttons.

Figure 6:
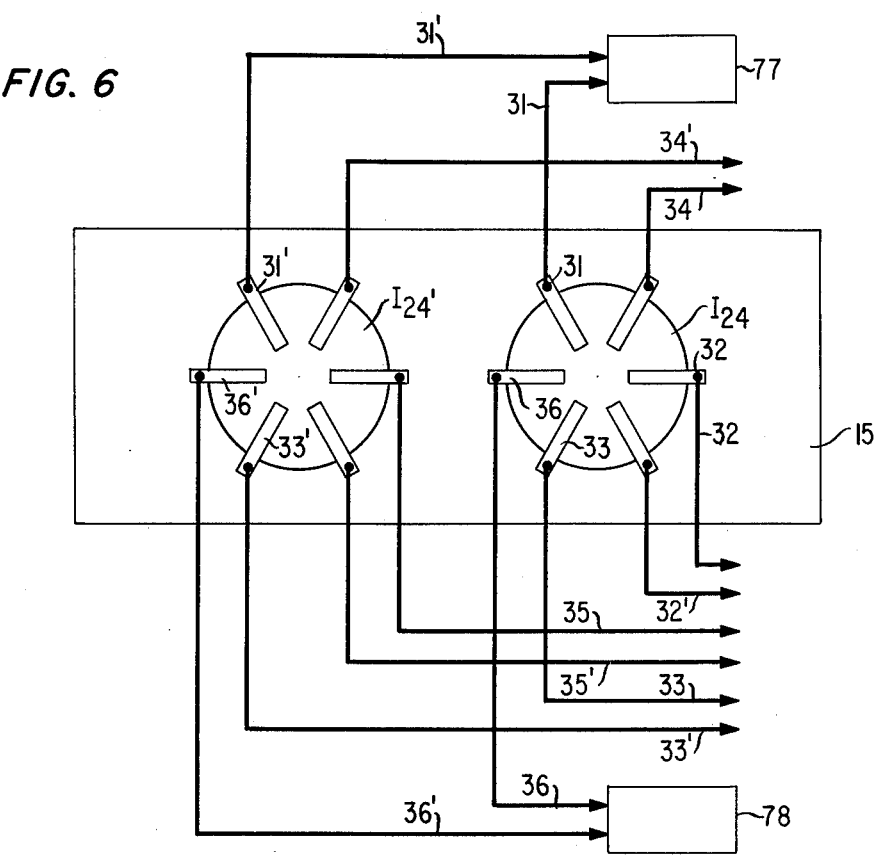

FIG. 6 shows the images $I_{24}$ and $I_{24'}$ of the two buttons in the image plane. The FIG. also shows the placement of detectors 31-36 (shown also in FIG. 2) as well as detectors $31'-36'$ for image $I_{24'}$. Like-designated detectors associated with the two images are connected to inputs to a comparator via like-designated conductors. Thus, for example, detectors 31 and 31' are connected to a comparator 77 and detectors 36 and 36' are connected to a second comparator 78. FIG. 6 shows the association between the detectors; FIGS. 4 and 5 illustrate the general electrical interconnection. Provision is made to apply like-positioned inner and outer detectors to associated comparators in this manner if both the placement of button holes and the rim geometry is to be inspected.

Of course, a circular button as shown has an intrinsic (rotational) symmetry. It should be clear, on the other hand, that consecutive elements need only be of like geometry to provide a translational symmetry and need have no intrinsic symmetry (viz: a Z shape). This is to say, like elements have like positions which dictate detector placement with the expectation that like signals are provided unless there exists a deviation from an anticipated geometry (i.e., the two objects differ). Any such deviation appears in the image plane as a change in the incident light intensity on one of the two associated detectors of a specified pair. The consequence is that the inputs to the associated comparator differ and a signal is generated for storage and processing. Otherwise, when no deviation occurs, no signals are generated and no storage or processing is necessary. In other words, the images of two objects (each with or without symmetry) form a single (two-object) image which has a symmetry which determines the placement of detectors in pairs to provide null operation.

Again, the system is insensitive to the orientation of a button. But, the buttons have to have like orientations.

A consideration of the amount of the storage requirements and the amount of information processed in a typical system in accordance with this invention as compared to a non-null system is helpful in understanding the advantages of such a system. For a three-hole button of the illustrative embodiment, twelve detectors, six inner and six outer are employed for each of two consecutive buttons. Consider that a one inch diameter button is employed and a resolution of 1 mil × 1 mil is desired. In an assumed inspection operation, there is one interval during which the detectors are triggered for a scan operation. In each scan period, therefore only 24 bits of information (signals) can be generated. This might be compared to over 3,000 bits of information to scan a circumference alone with the desired resolution in a non-null operation. For this operation, thousands of storage positions are necessary if a non-null operation is performed. The storage positions are required because a standard is necessarily stored in memory for comparison with the signals generated during each inspection operation in prior art systems.

In contradistinction, a null system in accordance with this invention requires no storage because no standard is stored. Only when a defect occurs does the null system provide a signal for processing. Thus, processing is required only infrequently. The probability of the occurrence of a defect (always low in manufacture) is a measure of the improvement in processing requirements of a null system over a non-null system.

For use on assembly line, a triggering or strobe device 80, shown in FIG. 1, strobes the light sources or enables the comparator in synchronism with the advance of conveyor belt 70. To this end, conveyor belt advance mechanism, represented by block 81 in FIG. 1, is adopted to synchronize the strobe and the belt movement. For 0.1 mil precision in the inspection of, for example, 1200 buttons per minute where the buttons have diameters of one inch and are one inch apart with the buttons moving at 40 inches per second ($2.5 \times 10^{-2}$ seconds per inch), an electrical system response of ($2.5 \times 10^{-2}$ sec/inch) $\times (10^{-4}$ inch$) = 2.5 \times 10^{-6}$ sec. or a band width of 1 megahertz is required.

The optical arrangement illustrated in FIG. 1, and alternative standard optical systems as well, permit a high degree of sensitivity to deviations depending on the placement of the detectors in the image plane. For example, if we consider a one inch diameter button, an image at unit magnification, and differentially amplified detectors, a deviation of one part in one thousand between the maximum and minimum dimensions of the (diameter of the) button would cause a (square) detector of ten square mils to change by ten percent of its peak value. The signal from the comparator rises from (a noise limited) zero to a value, depending on the amplification and illumination, which can easily be made one hundred times the noise level at balance.

Of course, the magnification of the image can be chosen to suit the particular application. Moreover, it is also possible to change the scale of the measurements for a given application by use of a zoom lens in place of a fixed focus lens in optical systems employing lenses instead of mirrors as illustrated. In this way, the same measurement system can be used to determine dimensions for different diameter samples with no change in the sample or in the lens position (the image plane being immobile). The scale can also be changed in the null method.

The arrangement of FIG. 1 may be adopted to collect light in the image plane indirectly with light pipes or fiber optics for transfer to detectors. The fibers could be fabricated so that the outputs from them could be applied to a self-scanned linear array of diodes so that more readily available electronics can be employed.

The general null arrangement can be used to inspect symmetrical features of any sort on discs as, for example, gear teeth. For gears, a set on detectors are placed at the image of the gear in numbers divisible into the number of teeth by an integer. Thus, for perfect alignment of detectors and the gear different detectors cover equivalent parts (or even equal numbers) of teeth of the gear. The only requirement for null operation is that the outputs from detectors, in pairs which correspond to equivalent portions of the gear, be applied to a comparator.

The general arrangement also can be used for the determination of the degree of alignment of two circular holes and for the determination of the uniformity of the inside or outside of a cylinder (i.e., gun barrel). In the case of two circular holes which are misaligned, a light beam directed through the holes projects an image of the two overlapping portions of the overlapping but noncoincident circles. The axis of the instrument is the direction of the beam of light, and detectors organized in pairs in accordance with this invention and placed at symmetrical positions with respect to the image apply unlike output signals to associated comparators indicative of misalignment.

In the case of cylindrical objects such as a gun barrel, a narrow cone of light is projected at the inner wall of the cylinder forming a circular image. If the object is not cylindrical, then a noncircular image is formed.

The determination of the dimension of an object also is simplified by the utilization of the null technique in accordance with this invention. Consider for example, the measurement of the length of an object an an assembly line as the object passes a pair of detectors spaced apart from one another, along the axis of movement of the object, a distance equal to the length of the object. The detectors are triggered when the leading edge is aligned with the first detectors and, for example, a difference signal from the two detectors indicates an object of improper length.

The null principle can be extended to "contouring" as a real-time alternative to holographic nondestructive testing. Contouring can be considered to be the determination of the height of a surface as a function of a position $(x,y)$ in a plane. The usual approach to contouring involves projecting a grid on the surface to be inspected. Consider the inspection of an automobile tire. Evacuation or inflation of a tire causes nonuniform surface changes around regions of tire defects. A holographic image of the tire surface at one pressure compared to another image at a second pressure can be used to provide an interferogram sensitive to separation dimensions causing surface deflections of as little as $6 \times 10^{-6}$ inch. A limitation in this system is due to pressure differential which must be below a limit at which fringes due to localized imperfection are swamped out by fringes from the remaining areas which are not defective. Thus, a limitation on the sensitivity which might be used to bring out a bump or depression occurs as a result of the holographic method itself.

In accordance with the null principle, a circular grid (concentric light and dark rings) is projected on the side of the tire and a rectangular grid is projected on the tread area. If a defect such as a bump occurs, a nonuniform grid is formed in an image plane at an angle to the normal to the surface at the bump. Thus, rotational or translational symmetry again can be turned to account via judiciously placed detectors, to provide a null except when a defect occurs. Large amplitude stressing is permitted with the null technique.

What has been described in considered merely illustrative of the principles of this invention. Therefore, various other embodiments of this invention can be devised by those skilled in the art in accordance with those principles as encompassed by the following claims.

What is claimed is:

1. Apparatus for inspecting an image of one or more objects having identical significant features (object), said apparatus including means for producing an image of (an object) said one or more objects in an image plane, means comprising a plurality of detectors placed in (different) identical positions (of like geometry) with respect to said significant features (image), and means coupled to detectors situated alike with respect to different identical features in pairs and responsive to outputs therefrom for producing a signal only when said outputs are different.

2. Optical apparatus for inspecting a succession of objects each of which has a plurality of critical areas of identical geometry thereon, light generating means for forming an image of said objects and said critical areas in an image plane, a plurality of detectors placed in said image plane in pairs at the images of said critical areas of at least two of said succession of objects, said detectors being responsive to incident light thereon for providing output signals from prescribed ones of said detectors in said pairs for providing a null indicative of the presence of identical images in like critical areas corresponding to each pair of detectors.

* * * * *